United States Patent [19]

Zakharov et al.

[11] 3,939,423

[45] Feb. 17, 1976

[54] AUTOMOBILE ACTIVE RECEIVING ANTENNA

[76] Inventors: Viktor Ivanovich Zakharov, Trifononskaya, ulitsa 51, korpus 7, kv. 32; Alexandr Alexeevich Zinichev, 15 Parkovaya ulitsa, 24, korpus 1, kv. 59; Oleg Ulyanovich Melnichuk, Chechersky pereulok, 4, korpus 1, kv. 20, all of Moscow, U.S.S.R.

[22] Filed: July 1, 1974

[21] Appl. No.: 485,351

[52] U.S. Cl. ................. 325/312; 325/375; 343/712

[51] Int. Cl.[2] ....................... H04B 1/18; H01Q 1/32

[58] Field of Search .................... 325/312, 373–375; 343/711–713

[56] References Cited

UNITED STATES PATENTS

| | | | |
|---|---|---|---|
| 3,099,797 | 7/1963 | Piccinini | 325/312 |
| 3,623,108 | 11/1971 | DuBois et al. | 343/712 |

*Primary Examiner*—George H. Libman

[57] ABSTRACT

An automobile active receiving broadcast band antenna having a bandpass filter input circuit capacitor formed by a metal member insulated from the automobile body and arranged in close vicinity to the windshield and by an automobile body structural element, an antenna body having arranged therein a bandpass filter, a frequency-modulated signal amplifier, an amplitude-modulated signal amplifier, a frequency correcting network, an interference filter, a frequency separation filter, said antenna body being mounted within the automobile interior. The effect of external mechanical and climatic factors on the antenna elements are minimized during operation, while the use of automobile radio receivers for the driver and passengers is made more convenient, without affecting the automobile's aerodynamic characteristics nor impairing the automobile's outside appearance.

3 Claims, 5 Drawing Figures

AUTOMOBILE ACTIVE RECEIVING ANTENNA

BACKGROUND OF THE INVENTION

The present invention relates to antenna systems, and more particularly to an automobile active receiving antenna which is suitable for use in automobile broadcast band receiving equipment.

DESCRIPTION OF THE PRIOR ART

It is common now to use passive networks in the form of rod or frame antennas (including those arranged at the windshield) in automobiles, as well as active receiving antennas of a "shortened" type in the form of rod or telescopic antennas, or antennas mounted at the wind mirror.

One prior art automobile active receiving antenna comprises a bandpass filter having a capacitor comprised of a structural element formed by the automobile metal hood (or metal wing) and the wing mirror metal frame or external shortened rod insulated therefrom, an antenna body which houses the bandpass filter, a frequency-modulated signal amplifier connected to the bandpass filter, a frequency correcting network, an amplitude-modulated signal amplifier connected with the bandpass filter via the frequency correcting network, an interference filter connected to power supply circuits of the frequency-modulated and amplitude-modulated signal amplifiers, a frequency separation filter through which the outputs of the frequency-modulated and amplitude-modulated signal amplifiers are connected to the radio receiver common feeder. The body of this prior art automobile receiving antenna is generally mounted outside of the automobile interior.

The electromagnetic energy is received by the capacitor. The received signals are fed to the bandpass filter and frequency correcting network for separating ultrashort-wave bands (frequency-modulated signals) from long-, medium- and short-wave bands (amplitude-modulated signals) and for shaping the desired frequency response of the ultrashort-wave band channel. Then, the signals are amplified and directed to the radio receiver input via the frequency separation filter.

In such antennas, the capacitance of the bandpass filter input circuit capacitor is determined by the effective height or electric length of the antenna rod, or the distance from the wing mirror metal frame to the car wing.

These prior art antennas, including passive rod and frame antennas, have the following disadvantages:

- it is necessary to seal the antenna's electric components (active elements) for their protection from moisture and dust;
- the requirement of complex antenna electric circuitry necessary for stabilization of the antenna parameters within the wide range of diverse automobile running conditions;
- a high probability of incurring mechanical damage to the antenna in various emergency situations, as a result of strong vibrations due to rough roads and as a result of ill-intentioned acts of vandalism;
- the hindrance of the antenna to the servicing of cars (i.e. washing, polishing, garaging, etc.);
- the inconvenience in setting up its antenna to the working position, poor reliability of telescopic antenna automatic drives, restricted field of vision due to the frame antenna being mounted on the windshield, etc.;
- the inconsistency of external passive and active antennas with the injury saftey requirements as regards the car's outside configuration (i.e., there should be no projecting, sharp or pointed parts on the car body, hood, wings, etc.).

SUMMARY OF THE INVENTION

Therefore, it is a principal object of the present invention to provide an automobile active receiving broadcast band antenna for radio receivers which has minimum exposure to the effect of external mechanical and climatic factors during operation, which is arranged within the automobile interior, is which easy, simple and reliable to use, and which does not restrict the driver's field of vision during driving.

The foregoing and other objects are attained in accordance with one aspect of the present invention through the provision of that in an automobile active receiving broadcast band antenna comprising a bandpass filter input circuit capacitor, an antenna body having arranged therein a bandpass filter, a frequency-modulated signal amplifier connected to said bandpass filter, a frequency correcting network, an amplitude-modulated signal amplifier connected with said bandpass filter via said frequency correcting network, an interference filter connected into the power supply circuits of said frequency-modulated and amplitude-modulated signal amplifiers, and a frequency separation filter through which the outputs of said frequency-modulated and amplitude-modulated signal amplifiers are connected to the radio receiver common feeder. The bandpass filter input circuit capacitor is formed by a metal member insulated from the automobile body and arranged within the automobile interior in close vicinity to the windshield and by an automobile body part, which antenna body is also mounted within the automobile interior.

The antenna body is preferably made in the form of a rear-view mirror bracket.

Further, the antenna body in the form of the rear-view mirror bracket comprises a dielectric.

The automobile active receiving broadcast band antenna according to the invention has an almost round directional pattern and a sensitivity which is on the average by 3 to 5 decibels better than the sensitivity of a conventional rod passive antenna 1.07 meters high.

BRIEF DESCRIPTION OF THE DRAWINGS

The invention will now be described in greater detail with reference to the accompanying drawings, wherein.

DESCRIPTION OF THE PREFERRED EMBODIMENT

Figure 1:
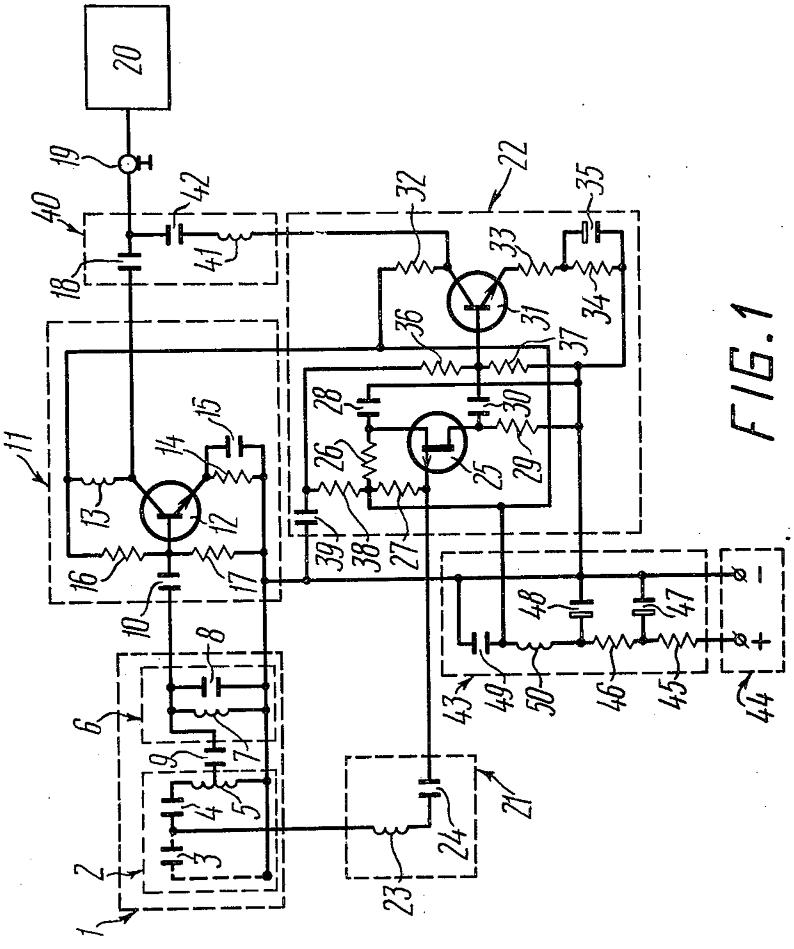
FIG. 1 is a combination block and schematic diagram of an automobile active receiving antenna according to a preferred embodiment of the present invention.

The automobile active receiving antenna comprises a bandpass filter 1 (FIG. 1) whose input circuit 2 includes a capacitor 3 made in the form of a structural element, a capacitor 4 which is a conventional capacitor, and an inductor 5. Another circuit 6 comprises an inductor 7 and a capacitor 8. Both circuits 2 and 6 are coupled by means of a capacitor 9 which is an isolating capacitor. The bandpass filter 1 has a frequency-modulated signal amplifier 11 connected to its output via a capacitor 10. The amplifier 11 comprises a bipolar transistor 12 with a loading coil 13, and a resistor 14 and a capacitor 15 in an automatic bias circuit. The base of transistor 12 is connected to a voltage divider including resistors 16, 17. The output of the frequency-modulated signal amplifier 11 is connected to a feeder 19 of a radio receiver 20 via an isolating capacitor 18.

The capacitor 3 has an amplitude-modulated signal amplifier 22 connected thereto via a frequency separation filter 21. The frequency separation filter 21 comprises a choke 23 and a capacitor 24. The first stage of the amplifier 22 includes a field-effect transistor 26 with resistors 26, 27 and a capacitor 28 in an automatic bias circuit with a load resistor 29. The second stage of the amplifier 22 is connected to the resistor 29 via an isolating capacitor 30 and uses a bipolar transistor 21 with a load resistor 32, and a negative feedback resistor 33, a resistor 34 and a capacitor 35 in an automatic bias circuit. The base of a transistor 31 is connected to the voltage divider consisting of resistors 36, 37, 38 and a capacitor 39. Connected to the load resistor 32 via a frequency correcting network 40 including a choke 41, capacitors 42 and 18 is the feeder 19 of the radio receiver 20.

The amplifiers 11 and 22 are powered from a power supply unit 44 of the car's electrical equipment (not shown) via an interference filter 43. The interference filter 43 comprises resistors 45, 46, capacitors 47, 48, 49 and a choke 50.

Figure 2:
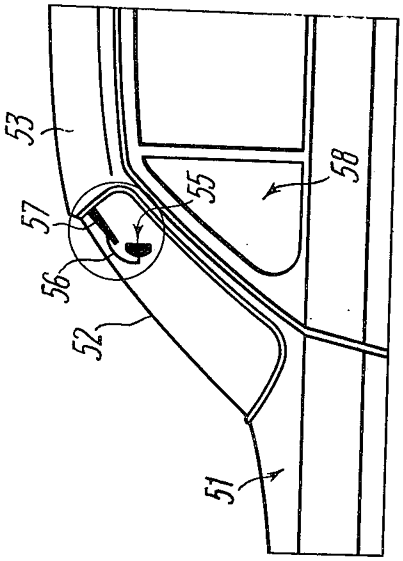
FIG. 2 is a side view showing the arrangement of the automobile active receiving antenna, according to the invention, within the car interior.

In accordance with the invention, the above-mentioned structural capacitor is formed by a metal member insulated from the body of a car 51 (FIG. 2) and is arranged in close vicinity to a windshield 52, and by a body structural part of the car 51, e.g. by the roof 53 of the car 51.

The metal member includes a metal backing 54 (FIG. 3) of a rear-view mirror 55 and a metal plate 56 through which the rear-view mirror 55 is articulated to an antenna body 57.

This metal member insulated from the body of the car 51 (FIG. 2) is mounted in close vicinity to the windshield 52 because the intensity of the electromagnetic field is maximum in this area.

The antenna body 57 (FIG. 3) is mounted in the interior 58 (FIG. 2) of the car 51 in close vicinity to the windshield 52 and also comprises the bracket of the rear-view mirror 55. This antenna body 57 in the form of the bracket of rear-view mirror 55 is made of a dielectric.

Figure 3:
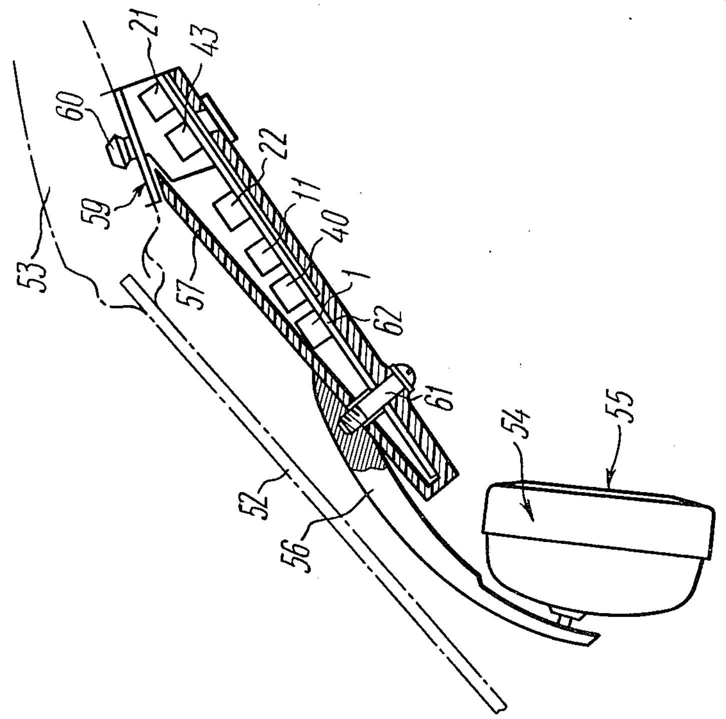
FIG. 3 is a side view in partial section of the automobile active receiving antenna according to the invention.

The antenna body 57 is rigidly secured to a front edge 59 (FIG. 3) of the cabin roof 53 of the car 51 (FIG. 2) by means of a lock 60 (FIG. 3).

The rear-view mirror 55 is articulated to the antenna body 57 by means of a metal plate 56 and a fastening assembly 61.

The antenna body 57 contains a printed circuit board 62 having mounted thereon the bandpass filter 1, the frequency-modulated signal amplifier 11, the amplitude-modulated signal amplifier 22, the frequency correcting network 40, the interference filter 43 and the frequency separation filter 21. The automobile active receiving antenna units are powered from the power supply unit 44 of the car's electrical equipment.

The operation of the automobile active receiving antenna is as follows:

The capacitor 3 (FIG. 1) which constitutes the aforedescribed structural element forms part of two receiving oscillatory circuits: one including the capacitor 3, and the choke 23 in the amplitude-modulated signal circuit, the other being the input circuit 2 of the bandpass filter 1 in the frequency-modulated signal circuit which comprises a capacitor 3, capacitor 4 and inductor 5.

The electromagnetic field drives both of the abovesaid receiving oscillatory circuits.

The oscillatory circuit including the capacitor 3 and choke 23 has a resonance frequency in the center of the amplitude-modulated signal band and is a source of the amplitude-modulated input signal voltage which is fed to the input of the amplifier 22 via an isolating capacitor 24.

The input oscillatory circuit 2 is a source of the frequency-modulated input signal alternating voltage, since the capacitor 4 offers high resistance to amplitude-modulated signals.

From the divider formed by the inductor 5 of the input circuit 2, the frequency-modulated signal voltage drives, via the coupling capacitor 9, the bandpass filter oscillatory circuit 6 including the inductor 7 and capacitor 8. The resonant frequencies of the circuits 6 and 2 and capacitance of the capacitor 9 determine the desired frequency response of the bandpass filter 1 thus ensuring optimum noise resistance for the transistor 12, rejection of all signals outside the bandwidth and thereby reducing the intermodulation distortion of the frequency-modulated signal amplifier 11.

From the bandpass filter 1, the frequency-modulated signal alternating voltage is fed to the base of the transistor 12 via the isolating capacitor 10. The linear operation of the transistor 12, as well as the match of its input impedance with the output impedance of the bandpass filter 1, is achieved by using the resistors 14, 16, 17 and capacitor 15. From the loading coil 13, the alternating voltage is fed via the isolating capacitor 18, to the feeder 19 of the radio receiver 20.

The amplitude-modulated signal alternating voltage is fed to the amplitude-modulated signal amplifier 22 from the filter 21 via the isolating capacitor 24.

The first stage of the amplifier 22 has a high-impedance input and comprises the common-source field-effect transistor 25. The operating conditions of the transistor 25 are determined by the resistors 26, 27 and capacitor 28. From the load resistor 29, the alternating voltage is fed, via the isolating capacitor 30, to the second stage of the amplifier 22 comprising a common-emitter bipolar transistor 31. The operating conditions of the transistor 31 are determined by the resistors 34, 36, 37, 38 and capacitors 35, 39. The resistor 33 improves the linearity of the amplifier 22 without any losses in the sensitivity. From the load resistor 32, the amplified signals are directed to the input of the frequency correcting network 40 for associating the inputs of the amplifiers 11 and 22 with the feeder 19 of the radio receiver 20. The choke 41 allows amplitude-modulated signals pass to the feeder 19 via the isolating capacitor 42 and prevents frequency-modulated signals from reaching the amplifier 22. The capacitor 18 prevents amplitude-modulated signals from reaching the amplifier 11. From the power supply unit 44, the voltage, having noise produced by the car electric equipment, is fed to the interference filter 43 including series-connected L-networks consisting of the resistors 45, 46, capacitors 47, 48, 49, and choke 50. The d-c output voltage of the filter 43 is used as a power source for the amplifiers 11 and 22.

Figure 4:
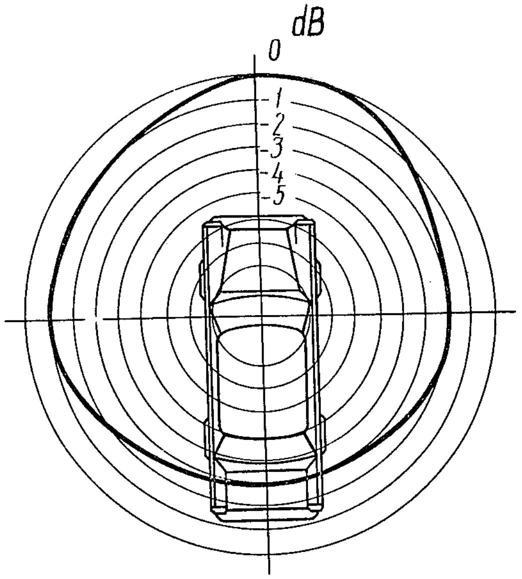
FIG. 4 is a directional voltage diagram of the automobile active receiving antenna in accordance with the invention.

The automobile active receiving broadcast band antenna made in accordance with the present invention has an almost round directional pattern, as can be seen in FIG. 4.

Figure 5:
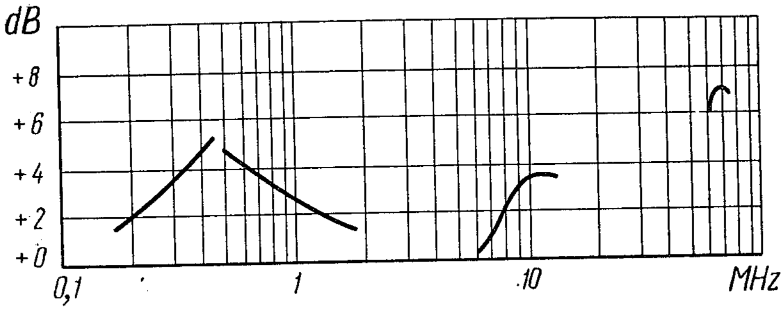
FIG. 5 is a graph showing the broadcast band sensitivity curves of the active receiving antenna arranged within the automobile interior, according to the invention, relative to the sensitivity of the prior art outside mounted passive rod antenna.

FIG. 5 shows the relative sensitivity curves of the automobile active receiving antenna according to the invention in the broadcast frequency bands (zero decibel level corresponds to the sensitivity of the conventional external passive rod antenna 1.07 meters high).

The automobile active receiving antenna of the present invention may be used in automobiles of practically all types.

The present invention minimizes the effect of external mechanical and climatic factors on the antenna elements during operation, provides for more convenience in use of automobile radio receivers for the driver and passengers, does not affect the automobile aerodynamic characteristics, and does not impair the automobile outside appearance.

We wish it to be understood that we do not desire to be limited to the exact details of construction shown and described, for obvious modifications will occur to a person skilled in the art.

What is claimed is:

1. An active receiving broadcast band antenna for an automobile radio receiver of amplitude and frequency modulated signals having a common feeder, comprising: an antenna body mounted within the automobile interior; a bandpass filter having an input circuit including a capacitor, said capacitor comprising a metal member insulated from the automobile body and arranged in close vicinity to the automobile windshield and a structural member of said automobile body, said bandpass filter being included within said antenna body; a frequency-modulated signal amplifier positioned within said antenna body having an input connected to said bandpass filter and having an output; a power supply circuit for said frequency-modulated signal amplifier; a frequency correcting network positioned within said antenna body; an amplitude-modulated signal amplifier positioned within said antenna body and having an input connected to said bandpass filter via said frequency correcting network and an output; a power supply circuit for said amplitude-modulated signal amplifier; an interference filter connected to said power supply circuits of said frequency-modulated and amplitude-modulated signal amplifiers; and a frequency separation filter, said outputs of said frequency-modulated and amplitude-modulated signal amplifiers being connected to said common feeder of said radio receiver via said frequency separation filter.

2. An automobile active receiving antenna as claimed in claim 1, wherein said antenna body comprises and is structurally configured as a rear-view mirror bracket.

3. An automobile receiving antenna as claimed in claim 2, wherein said antenna body structurally configured as a rear-view mirror bracket comprises a dielectric.

* * * * *